April 14, 1953            D. FIRTH            2,634,620
V BELT CLUTCH
Filed March 28, 1951            4 Sheets-Sheet 2
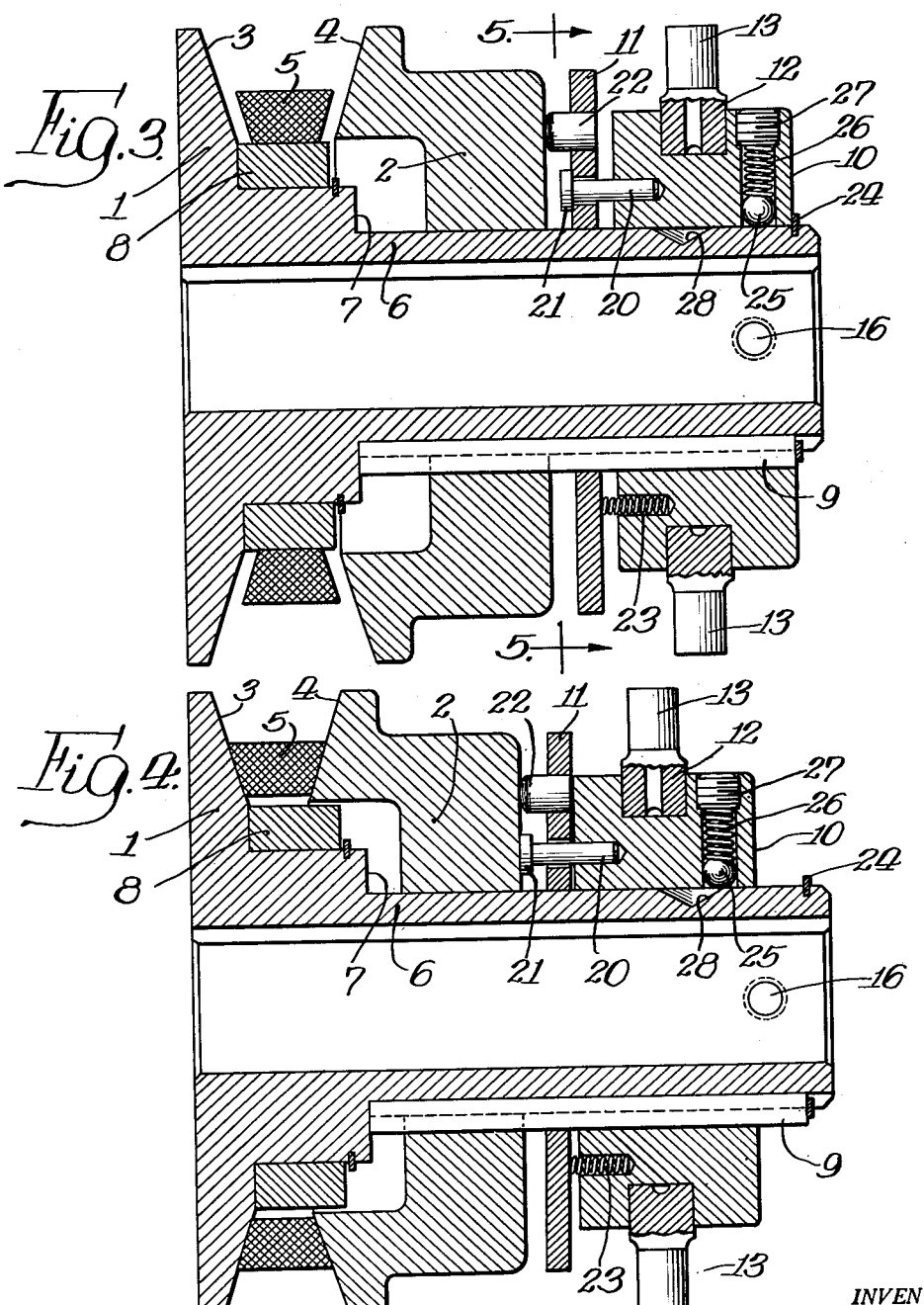

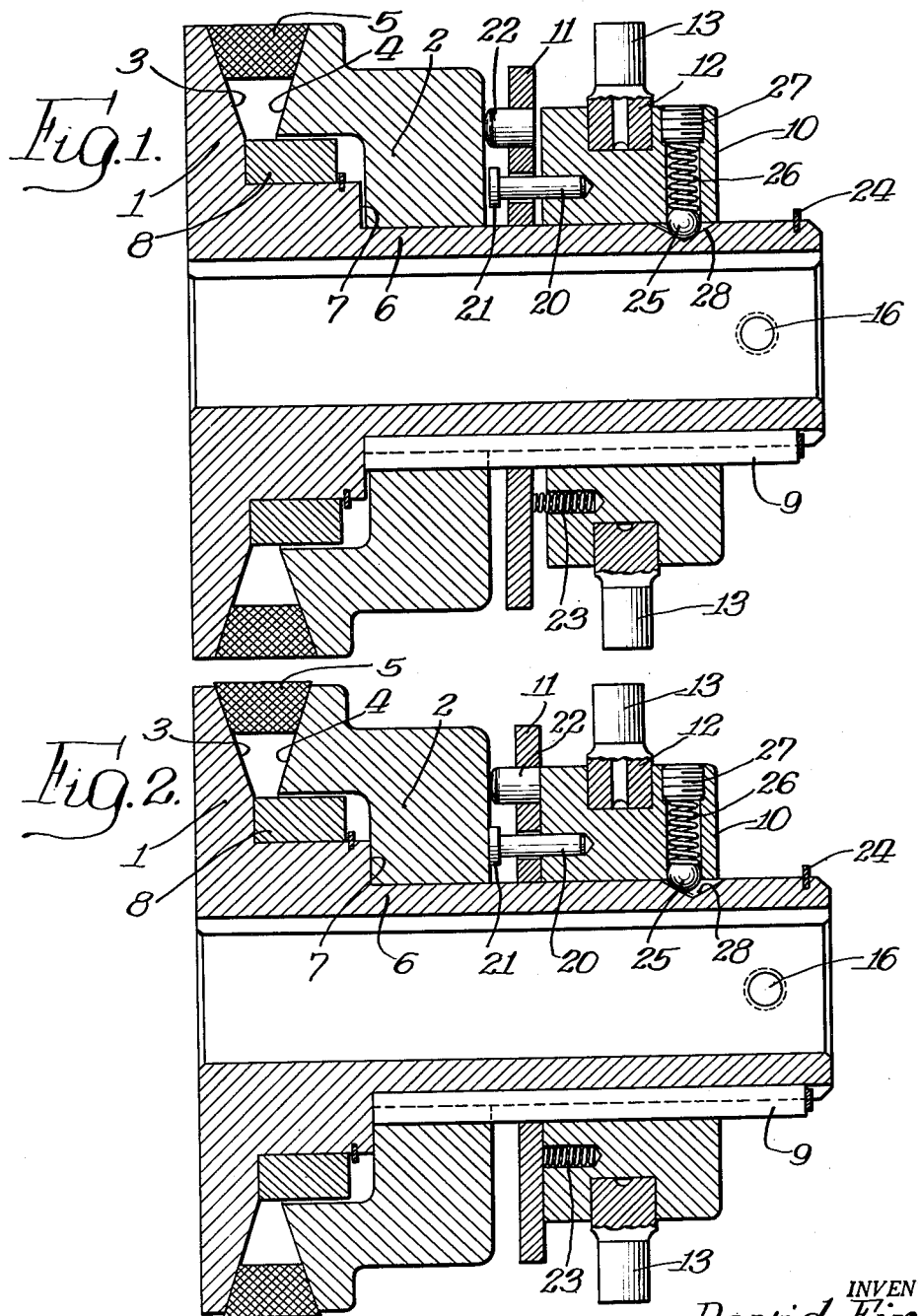

April 14, 1953 D. FIRTH 2,634,620
V BELT CLUTCH
Filed March 28, 1951 4 Sheets-Sheet 3

INVENTOR.
David Firth,
BY Osgood H. Dowell
Atty.

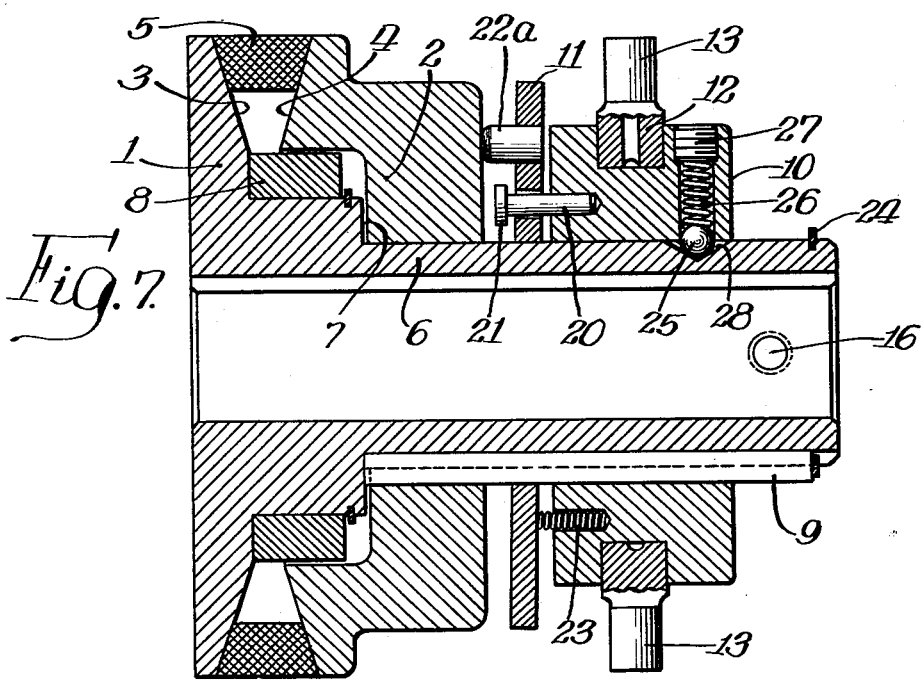

Patented Apr. 14, 1953

2,634,620

UNITED STATES PATENT OFFICE 2,634,620

V BELT CLUTCH

David Firth, South Bend, Ind., assignor to Dodge Manufacturing Corporation, Mishawaka, Ind., a corporation of Indiana Application March 28, 1951, Serial No. 218,043

10 Claims. (Cl. 74—230.17)

The type of device known as a V-belt clutch is a sheave comprising relatively axially movable members and mechanism operable under running conditions for causing them alternately to clutch and release an interposed V-type belt.

The present invention provides a sheave of said type having novel mechanism of simple and practicable character for alternately establishing and disestablishing driving relationship of the belt-engaging members. An advantage of the invention is that it allows under running conditions not only alternate clutching and release of the belt but also variation of the driving relationship of the sheave members for speed adjustment.

The invention utilizes a very simple means for locking the axially shiftable sheave member in driving relation to the opposing member, such locking means being releasable by retractive movement of a shifter sleeve, and provides an organization which as a whole is practicable and efficient. By virtue of a subsidiary feature of the invention, the establishment of a relationship of the sheave members for driving at maximum effective sheave diameter is very easily and quickly accomplished.

In the sense of this specification, a driving relationship of the sheave members is one in which the belt is engaged by said members for transmission of power to or from the sheave. The expression "under running conditions" means while the belt is driving or being driven by the sheave, or while either the belt or sheave is running without transmission of power to the other, due to a release condition of the sheave.

A sheave embodying the invention in one practicable form is shown for illustration in the accompanying drawings.

Figs. 1 to 4 are longitudinal sections of the illustrative sheave, showing the parts thereof in various different relations.

Fig. 1 shows the sheave in a so-called maximum diameter driving condition, in which the sheave members engage and hold the belt in the outermost position which it can assume in the sheave without protruding beyond the peripheries of the friction faces of the sheave members.

Fig. 2 shows the relationship of the parts at the instant when the axially shiftable sheave member is moved by the shifter sleeve to an extreme forward position, slightly beyond the maximum diameter driving position, thereby pushing the belt outwardly to a position such that its outer surface protrudes slightly beyond the peripheries of the friction faces of the sheave members.

Fig. 3 shows the sheave in a release condition, its belt-engaging members having spread so far apart that the belt, being disengaged, has dropped to and now runs idly on a freely rotatable ring mounted on the hub of the fixed sheave member.

Fig. 4 shows the sheave in condition for driving at about minimum effective sheave diameter, the belt being held by the confronting friction faces of the sheave members in a position clear of contact with the rotatable ring above mentioned.

Fig. 7 is a view corresponding to Fig. 1 of a sheave having a relatively longer washer stud than in the preceding figures, the construction of Fig. 7 being otherwise similar to that of the preceding figures.

Figure 5:
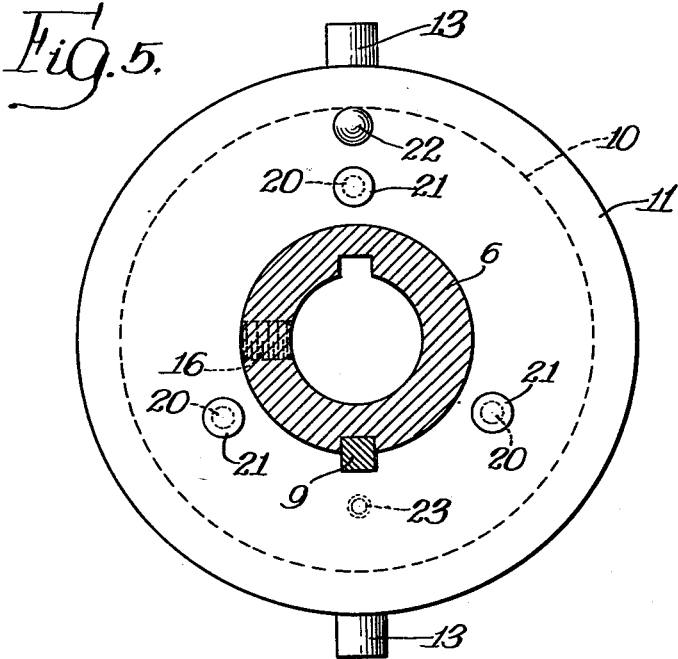
Fig. 5 is a cross-section taken on the line 5—5 of Fig. 4, looking in the direction of the arrows and showing parts behind the section in front elevation.

The illustrative sheave comprises coaxial annular members 1 and 2 having confronting conical faces 3 and 4 for tractive engagement with the opposite sides of an interposed V-type belt 5. The member 1 is fast on a hub 6 to be fixed on a shaft, which hub extends through and carries the axially shiftable member 2. In the specific structure shown, the extended portion of the hub carrying the member 2 and devices behind it is of reduced outside diameter, thereby providing a hub shoulder 7 which limits forward movement of the shiftable member 2. Mounted on the thicker portion of the hub adjacent to 1 is a freely rotatable ring 8 on which the belt runs idly when released from the sheave members. The member 2 is so formed that the portion thereof having the friction face 4 overlies said ring without contact therewith when the sheave members are in driving relation.

Slidably fitted on the hub and splined thereto by the spline 9 are the shiftable sheave member 2, a shifter sleeve 10 behind it, and a locking washer 11 interposed between said member and sleeve. The shifter sleeve 10, of large radial thickness, has swiveled thereto a collar 12 formed with diametrically opposite trunnion 13 for engagement by a shifter yoke or by the yoke arms of any suitably arranged shifting lever.

Figure 6:
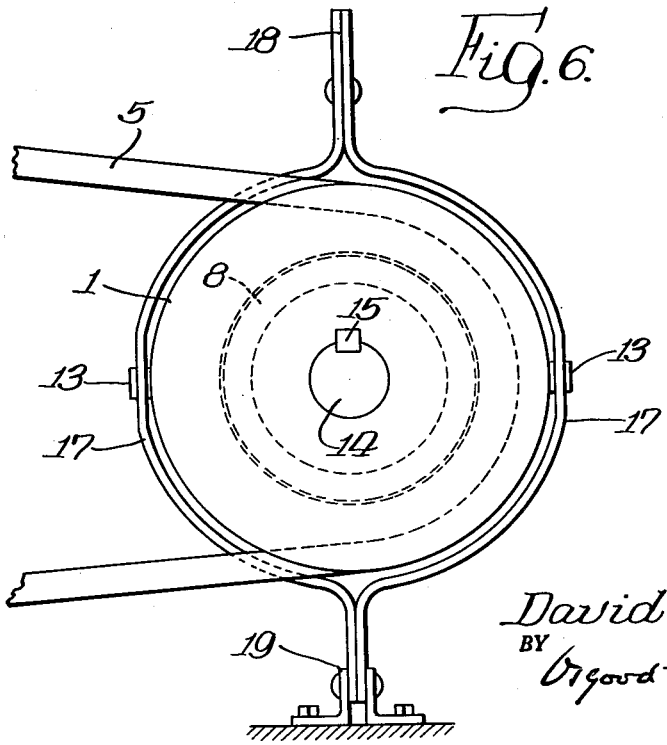
Fig. 6 is a rear end elevation on a reduced scale of the sheave installed for use and equipped with a shifting lever.

In Fig. 6, the sheave is shown mounted on a shaft 14 to which the sheave hub is keyed by a driving key engaging in the hub keyway 15. A short setscrew 16 (Fig. 5) engaging in a threaded hole in the hub is screwed against the shaft to prevent axial displacement of the hub relation to the shaft. In said Fig. 6, the swiveled collar 12 is shown arranged with its trunnions 13 extending horizontally and engaging in holes of the yoke arms 17 of a shifting lever 18 pivoted to a fixture 19 and arranged for movement in a plane parallel to the shaft. By means of said lever the shifter sleeve 10 can be moved forwardly and backwardly as required to shift the member 2 to any desired position in driving relation to the opposing member 1 and to release it and allow it to be moved backward by the belt.

The shifter sleeve 10 carries a plurality of forwardly projecting pins 20 fixed to said sleeve and extending loosely through the washer 11 in holes therefor of sufficient diameter to allow canting of the washer as hereinafter described. Said pins are formed with heads 21 of larger diameter than said holes, so that the washer can be pulled backwards by the pins on retractive movement of the shifter sleeve. The pin heads 21 are spaced from the shifter sleeve a distance considerably greater than the thickness of the washer, so that when the sleeve 10 presses against the washer, as in Fig. 2, a considerable clearance exists between the pin heads and washer, and when the pin heads are pulled back against the washer, as in Fig. 3, a like clearance exists between the shifter sleeve 10 and washer.

The washer 11 is adapted to be canted to grip the hub 6 in such manner as to prevent backward movement of the washer except when pulled backwards by the pins 20 on retractive movement of the shifter sleeve 10. Fixed to the washer is a forwardly projecting stud 22, shown having a rounded fore end and of such length that it contacts with the back face of the shiftable member 2 when the pin heads 21 are pressed against the latter by the shifter sleeve. The stud 22 is so located that a backward force thereon will cant the washer to hub-gripping position as in Figs. 1 and 4. At a point diametrically opposite said stud a forward pressure is exerted against the washer by a coiled spring 23 contained in a bore therefor in the shifter sleeve. This spring initiates and assists in the canting of the washer which is completed by back pressure of the member 2 against the stud 22. The force exerted by the spring 23 is not so great but that it may be overcome or partially overcome by forward pressure of the shifter sleeve against the washer, as shown for example in Fig. 2. Conditions are such that the washer can be pushed forward by the shifter sleeve, but cannot be pushed backward by back pressure of the member 2 against the stud 22. Nor can the washer be moved backwardly except by a backward movement of the pin heads 21 against the washer with sufficient force to release it from gripping engagement with the hub. Hence when the sheave members 1 and 2 are in driving relation, the canted washer locks the shiftable member 2 in its driving position, since back pressure of the belt transmitted by said member 2 to the stud 22 holds the washer in its hub-gripping position.

On forward movement from a retracted position, the shifter sleeve 10, after taking up the clearances between 10 and 11 and between 2 and 21, pushes the washer 11 forward and also pushes the shiftable member 2 forward by the pins 20 or by said pins and the washer stud 22. By means of the shifting lever 18 of Fig. 6, the shifter sleeve can be forced against the belt to any selected position, whereupon the belt, being gripped by and between the friction faces 3 and 4, will move outwardly and assume a position in the sheave suitable to the spacing of said faces at the moment when forward movement of the shifter sleeve ceases. Upon release of forward pressure on the shifter sleeve, the back pressure of the belt pushes the member 2 against the stud 22, thereby forcing the already partially canted washer 11 to tight gripping engagement with the sheave hub. The member 2 is thereby locked in very nearly the position to which it was advanced by the shifter sleeve. This action involves a slight back movement of the member 2, to effect canting of the washer to tight gripping engagement with the sheave hub. As this slight movement occurs, the belt settles or moves inwardly slightly in the sheave. Such slight back movement of the member 2 as occurs is imparted to the shifter sleeve by the pins 20.

Assume for example that the shifter sleeve has pushed the member 2 against the belt to a position very slightly forward of its so-called minimum diameter driving position shown in Fig. 4, so that the belt will have moved outwardly slightly further than to the position shown in said figure. Upon release of forward pressure on the shifter sleeve, the spring 23 will cant or start the canting of the washer 11, which by back pressure of the belt, transmitted by the member 2 to the stud 22, will be further canted to grip the sheave hub, while the belt settles or moves slightly inwardly in the sheave to approximately the position shown in said figure.

In like manner the shiftable member 2 can be forced by the shifter sleeve to any position in driving relation to the opposing member 1 and automatically locked by the canted washer. When said member 2 is in the minimum diameter driving position shown in Fig. 4, or in any position between the minimum and maximum diameter positions, it can be forced further forward by the shifter sleeve, thus forcing the belt outwardly in the sheave, and automatically locked in approximately or very nearly the position to which it is so forced. Thus under running conditions the driving relationship of the sheave members 1 and 2 can be varied as desired for speed adjustment.

It will be understood of course that the sheave can be caused alternately to clutch and release the belt. A release condition is established by a sufficient retractive movement of the shifter sleeve 10 to allow the belt as it moves inwardly to push the shiftable member 2 so far back that the belt, being disengaged and released from the friction faces 3 and 4, will drop to and run idly on the freely rotatable ring 8. Such a release condition is shown in Fig. 3. In this figure, the shifter sleeve 10 is shown in its rearmost position, where it abuts a stop shoulder provided in this instance by a contractile split ring 24 engaging in an annular groove in the sheave hub.

During driving operations, i. e. while the belt is running in driving engagement with the sheave, the shifter sleeve 10 should be held from back movement by shaft vibration, lest such movement might pull the pin heads 21 against the canted washer 11 with sufficient force to release it from gripping engagement with the sheave hub. To prevent or minimize opportunity for such an accidental releasing action, the shifter sleeve is equipped with a spring-pressed detent cooperable with the sheave hub to resist back movement of said sleeve by shaft vibration. Said detent is shown as a ball 25 slidably fitted in a radial bore in said sleeve and pressed against the hub by a coiled spring 26 compressed between the ball and a screw-plug 27. The force exerted by the spring may be such that the pressure of the ball against even a cylindrical hub surface will effectually hold the shifter sleeve from being moved rearwardly by shaft vibration.

When the sheave is in the maximum diameter driving condition shown in Fig. 1, the shifter sleeve 10 may be releasably locked in place by engagement of the ball 25 in any appropriate recess in the hub, e. g. a hemispherical or conical recess or a semicircular or V-shaped groove of appropriate dimensions to enable the ball to seat therein and to be removable therefrom by a forced backward movement of the shifter sleeve. In the illustrative structure, the hub is formed with a conical recess 28 of large area relative to its depth and so located that at the instant when the shiftable member 2 is pushed by the shifter sleeve to its extreme forward position, the sheave parts being then in the relationship shown in Fig. 2, the ball 25 bears on the inclined hub surface in said recess at a point slightly forward of the center of said recess. Reaction of the pressure of the spring-pressed ball against said surface causes a slight backward movement of the shifter sleeve until the ball seats in said recess over the center thereof, thus releasably locking the shifter sleeve. Meanwhile the belt 5, which in Fig. 2 protrudes slightly beyond the peripheries of the friction faces 3 and 4, settles or moves slightly inwardly to the position shown in Fig. 1, forcing the member 2 back against the stud 22 and canting the washer 11 to locking position.

By virtue of the conical recess 28, located as described in relation to the spring-pressed ball 25, the establishment of conditions for driving at maximum effective sheave diameter, as shown in Fig. 1, can be very easily and quickly accomplished simply by shifting the shifter sleeve 10 forwardly as far as it will go, i. e. until the shiftable member 2 is moved to its extreme forward position against the hub shoulder 7.

In positions of the shifter sleeve between those of Figs. 1 and 4, the ball 25 bears on the declined hub surface in the recess 28 behind the center of said recess, thus urging the shifter sleeve forwardly and obviating any possibility of its being moved backwardly by shaft vibration.

The several advantageous effects incident to provision of the conical recess 28 would be obtained if there were substituted for said recess an annular V-groove in the hub, of appropriate width and located with its center the same distance from 7 as the center of said recess.

In the illustrative structure, the length of the stud 22, considered as the distance from its tip to the back face of the washer 11, is no greater than the length of the pins 20 considered as the distance from the plane of their front faces to the front face of the shifter sleeve 10, wherefore the pins 20 function as push pins as well as pull pins. However, within the scope of the invention, the length of the stud considered as the distance stated may be greater than said length of the pins, in which case forward movement of the shifter sleeve, after taking up the clearance between it and the washer, will be imparted to the shiftable member 2 by the washer and stud, and the pins 20 will function only as pull pins on retractive movement of the shifter sleeve. A construction in which said stud length is substantially greater than said pin length is practicable.

Said stud length may be less than said pin length, but preferably only very slightly less, for the shorter the said stud length than the said pin length, the greater is the inward settling of the belt in the sheave and backward movement of the shiftable member 2 for establishing a locked driving condition of the sheave and the less is the clearance between the pin heads 21 and the washer as such condition is established. However said clearance could be increased by forming the washer with recesses open at the front to receive the pin heads 21.

Thus in operative embodiments of the basic invention the distance from the back face of the washer 11 to the tip of the stud 22 may be equal to or somewhat more or less than the distance from the front face of the shifter sleeve 10 to the plane of the front faces of the pin heads 21, though if the first mentioned distance is materially greater than the second the pins 20 will function only as pull pins. Preferably said first mentioned distance is equal to or so very slightly less than the second mentioned distance that the stud 22 contacts with the shiftable member 2 when the pins 20 are pushed or held against said member by forward pressure of the shifter sleeve.

If, in a construction similar to that shown, the first distance above mentioned were about from $\frac{3}{64}''$ to $\frac{1}{16}''$ shorter than the second mentioned distance, back pressure of the member 2 against the stud 22 could initiate and complete the canting of the washer 11 to hub-gripping position without aid of the spring 23, which therefore could be omitted. Also said spring could be omitted if the stud 22 were so inclined to the washer that the distance between the axes of the stud and washer were substantially greater at the fore end of the stud than at the back of the washer, in which case back pressure of the member 2 against the stud would cant the washer.

Fig. 7 shows a structure having a washer stud 22ᵃ of such length that the distance from the tip of the stud to the back face of the washer exceeds the distance which the pins 20 extend from the front face of the shifter sleeve 10, the structure being otherwise substantially identical to that shown in the preceeding figures. In this instance, forward movement of the shifter sleeve after taking up lost motion is transmitted to the shiftable member 2 by the washer and stud 22ᵃ, and the pins 20 serve only to pull back the washer on retractive movement of the shifter sleeve. Fig. 7 is a view corresponding to Fig. 1, showing the sheave in maximum diameter driving condition, which is established in the same manner as previously described with reference to Figs. 1 and 2. Before said condition is established, the shiftable parts 2, 11 and 10 are moved to their extreme forward position, as in Fig. 2. At the instant when said parts are moved to said extreme forward position, the member 2 being pushed against the hub shoulder 7, the spring-pressed ball 25 bears on the inclined surface in the hub recess 28 at a point forward of the center of said recess. As soon as forward pressure on the shifter sleeve is released, the reaction of the pressure of the ball on said surface urges the shifter sleeve backward until the ball seats in said recess over its center, as shown in Fig. 7. Meanwhile the belt 5 settles inwardly and pushes the shiftable member 2 backward against the stud 22ᵃ, with the resultant canting of the washer 11 to hub-gripping position, thereby locking the shiftable member 2 in its maximum diameter driving position. In this instance the back pressure of the member 2 against the stud 22ª would effect canting of the washer without aid of the spring 23, which may therefore be omitted. Thus the desirable operation heretofore described with reference to Figs. 1 and 2, whereby the sheave can be quickly conditioned for driving or being driven by the belt at maximum effective sheave diameter, is obtainable also with the structure of Fig. 7.

The ring 8 may be antifrictionally mounted, or, in lieu thereof, there may be substituted an antifriction bearing unit comprising caged balls or rollers on which the belt can run.

The washer stud 22 may be made adjustable in effective length by employing as such stud a screw engaging in a threaded hole in the washer and secured against accidental turning by a lock nut screwed against the washer.

I claim:

1. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, and means interposed between said sleeve and shiftable member whereby driving relationship of said members can be established and disestablished by forward and backward shifting of said sleeve, said means including a washer slidably fitted on said hub and having a forwardly projecting stud and adapted to be canted in a manner such that back pressure on said stud will hold the washer in gripping engagement with the hub, said washer being loosely connected with said sleeve in a manner to permit the washer to be released from gripping engagement with the hub and pulled backwards by said sleeve.

2. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, means to effect locking of said shiftable member in driving relation to the opposing member comprising a washer slidably fitted on said hub between said sleeve and shiftable member and having a forwardly projecting stud and adapted to be canted in a manner such that back pressure of said shiftable member against said stud will hold the washer in gripping engagement with the hub, and means comprising pins fixed to and projecting forwardly from said sleeve loosely connecting said washer and sleeve in a manner allowing only limited relative axial movement thereof and canting of the washer, whereby the washer can be released from gripping engagement with the hub and pulled backwards by said sleeve, the two means aforesaid being constructed and arranged for transmission of forward movement of said sleeve to said shiftable member by at least one of said means.

3. A sheave according to claim 1 having means comprising a spring-pressed detent carried by said sleeve and cooperable with said hub to resist rearward movement of said sleeve by shaft vibration.

4. A sheave according to claim 2 having in said sleeve a ball slidable in a bore therein and spring-pressed against the hub, said hub having a recess providing in the line of travel of said ball surfaces slanting in opposite directions from the center of said recess to the cylindrical surface of the hub, said recess being so located that when shiftable parts of the structure are in their extreme foremost position said ball bears in said recess at a point forward of the center of said recess, for the purpose described.

5. A sheave comprising coaxial annular members having confronting faces for tractive engagement with the opposite sides of an interposed V-belt, one of said members being axially shiftable, a hub having said shiftable member thereon and the opposing member fast thereon, a shifter sleeve slidable on said hub behind said shiftable member, a locking washer slidably fitted on said hub between said sleeve and shiftable member, said washer having a forwardly projecting stud and adapted to be canted to a hub-gripping position in which it will be held by back pressure on said stud, and a plurality of pins fixed to and projecting forwardly from said sleeve and extending through said washer in holes therefor large enough to allow canting of the washer, said pins having heads whereby the washer can be pulled back by said pins on retractive movement of said sleeve, said heads being spaced sufficiently from said sleeve to provide ample clearance between said heads and washer under all conditions requiring such clearance, said pins being of such length that said sleeve can push said shiftable member forwardly by said pins or pins and stud.

6. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, a locking washer slidably fitted on said hub between said sleeve and shiftable member, said washer having a forwardly projecting stud and adapted to be canted to a hub-gripping position in which it will be held by back pressure on said stud, a spring arranged to initiate and assist in such canting of the washer, and a plurality of pins fixed to and projecting forwardly from said sleeve and extending through said washer in holes therefor large enough to allow canting of the washer, said pins having heads whereby the washer can be pulled back by said pins on retractive movement of said sleeve, said heads being spaced sufficiently from said sleeve to provide ample clearance between said heads and washer under all conditions requiring such clearance, said pins being of such length that said sleeve can push said shiftable member forwardly by said pins or pins and stud.

7. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, a locking washer slidably fitted on said hub between said sleeve and shiftable member, said washer having a forwardly projecting stud and adapted to be canted to a hub-gripping position in which it will be held by back pressure on said stud, and a plurality of pins fixed to and projecting forwardly from said sleeve and extending through said washer in holes therefor large enough to allow canting of the washer, said pins having heads whereby the washer can be pulled back by said pins on retractive movement of said sleeve, said heads being spaced sufficiently from said sleeve to provide ample clearance between said heads and washer under all conditions requiring such clearance, said pins functioning as both push pins and pull pins, the distance from the back face of the washer to the tip of said stud being about equal to the distance which said pins extend from the front face of said sleeve.

8. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, a locking washer slidably fitted on said hub between said sleeve and shiftable member, said washer having a forwardly projecting stud and adapted to be canted to a hub-gripping position in which it will be held by back pressure on said stud, and a plurality of pins fixed to and projecting forwardly from said sleeve and extending through said washer in holes therefor large enough to allow canting of the washer, said pins having heads whereby the washer can be pulled back by said pins on retractive movement of said sleeve, said heads being spaced sufficiently from said sleeve to provide ample clearance between said heads and washer under all conditions requiring such clearance, said pins functioning as both push pins and pull pins; the distance from the back face of the washer to the tip of said stud being substantially less than the distance which said pins extend from the front face of said sleeve.

9. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, a locking washer slidably fitted on said hub between said sleeve and shiftable member, said washer having a forwardly projecting stud and adapted to be canted to a hub-gripping position in which it will be held by back pressure on said stud, and a plurality of pins fixed to and projecting forwardly from said sleeve and extending through said washer in holes therefor large enough to allow canting of the washer, said pins having heads whereby the washer can be pulled back by said pins on retractive movement of said sleeve, said heads being spaced sufficiently from said sleeve to provide ample clearance between said heads and washer under all conditions requiring such clearance, the distance from the back face of the washer to the tip of said stud being substantially greater than the distance which said pins extend from the front face of said sleeve, forward movement of said sleeve after taking up lost motion being transmitted to said shiftable member by said washer and stud.

10. A sheave comprising coaxial annular members having confronting faces for tractive engagement with the opposite sides of an interposed V-belt, one of said members being axially shiftable, a hub having said shiftable member slidable thereon and the opposing member fast thereon, a shifter sleeve slidable on said hub behind said shiftable member, a locking washer slidably fitted on said hub between said sleeve and shiftable member, said washer having a forwardly projecting stud and adapted to be canted to a hub-gripping position in which it will be held by back pressure on said stud, a spring arranged to initiate and assist in such canting of the washer, and a plurality of pins fixed to and projecting forwardly from said sleeve and extending through said washer in holes therefor large enough to allow canting of the washer, said pins having heads whereby the washer can be pulled back by said pins on retractive movement of said sleeve, said heads being spaced sufficiently from said sleeve to provide ample clearance between said heads and washer under all conditions requiring such clearance, the distance from the back of the washer to the tip of said stud being substantially greater than the distance which said pins extend from the front face of said sleeve, whereby said sleeve can push said shiftable member forwardly by said washer and stud.

DAVID FIRTH.

References Cited in the file of this patent

UNITED STATES PATENTS

| Number | Name | Date |
|---|---|---|
| 759,139 | Temple | May 3, 1904 |
| 2,182,956 | Beyerline | Dec. 12, 1939 |
| 2,259,149 | Cederstrom | Oct. 14, 1941 |
| 2,341,465 | Monnot | Feb. 8, 1944 |
| 2,567,571 | Merriman | Sept. 11, 1951 |

FOREIGN PATENTS

| Number | Country | Date |
|---|---|---|
| 4,660 | Great Britain | 1908 |